United States Patent
Sherman et al.

(10) Patent No.: US 10,963,561 B2
(45) Date of Patent: Mar. 30, 2021

(54) SYSTEM AND METHOD TO IDENTIFY A NO-OPERATION (NOP) SLED ATTACK

(71) Applicant: Intel Corporation, Santa Clara, CA (US)

(72) Inventors: Brent Sherman, Portland, OR (US);
Rodrigo Branco, Hillsboro, OR (US);
Geoffrey Scott Sidney Strongin, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 16/121,590

(22) Filed: Sep. 4, 2018

(65) Prior Publication Data

US 2019/0042740 A1 Feb. 7, 2019

(51) Int. Cl.
*G06F 21/00* (2013.01)
*G06F 21/55* (2013.01)
*G06F 21/56* (2013.01)
*G06F 21/52* (2013.01)

(52) U.S. Cl.
CPC ............ *G06F 21/554* (2013.01); *G06F 21/52* (2013.01); *G06F 21/566* (2013.01); *G06F 2221/033* (2013.01)

(58) Field of Classification Search
CPC ...... G06F 21/554; G06F 21/52; G06F 21/566; G06F 2221/033
See application file for complete search history.

(56) References Cited

U.S. PATENT DOCUMENTS

| 9,438,623 | B1 * | 9/2016 | Thioux | H04L 63/1466 |
| 9,454,676 | B2 * | 9/2016 | Vipat | G06F 21/79 |
| 9,594,912 | B1 * | 3/2017 | Thioux | G06F 21/566 |
| 9,904,792 | B1 * | 2/2018 | Badishi | G06F 21/62 |
| 9,973,531 | B1 * | 5/2018 | Thioux | G06F 9/45558 |
| 10,049,211 | B1 * | 8/2018 | Lukacs | G06F 21/566 |
| 10,430,586 | B1 * | 10/2019 | Paithane | H04L 63/145 |
| 2005/0229164 | A1 * | 10/2005 | Giraud | G07F 7/1008 717/130 |
| 2006/0026685 | A1 * | 2/2006 | Saito | G06F 21/52 726/23 |
| 2008/0016314 | A1 * | 1/2008 | Li | G06F 12/1408 711/200 |
| 2009/0300764 | A1 * | 12/2009 | Freeman | G06F 21/55 726/24 |
| 2010/0125913 | A1 * | 5/2010 | Davenport | H04L 63/1466 726/25 |

(Continued)

*Primary Examiner* — John B King
(74) *Attorney, Agent, or Firm* — Patent Capital Group

(57) ABSTRACT

Particular embodiments described herein provide for an electronic device that can be configured to help with the identification of a no-operation (NOP) sled attack identify. The system can be configured to receive an instruction, increment a value in a total instruction counter, increment a value in a branch instruction counter when the instruction is a branch instruction, increment a value in a memory instruction counter when the instruction is a memory instruction, create a ratio based on the value in the total instruction counter and the value in the branch instruction counter or the value in the memory instruction counter, and trigger an alert when the ratio satisfies a threshold. The ratio can indicate the presence of a NOP sled attack and the alert can be an interrupt that stops execution of the NOP sled.

25 Claims, 10 Drawing Sheets

(56) References Cited

U.S. PATENT DOCUMENTS

| | | | | |
|---|---|---|---|---|
| 2010/0205674 A1* | 8/2010 | Zorn | ............... | G06F 21/556 |
| | | | | 726/25 |
| 2010/0235913 A1* | 9/2010 | Craioveanu | ......... | G06F 21/563 |
| | | | | 726/23 |
| 2014/0181976 A1* | 6/2014 | Snow | ............... | G06F 21/566 |
| | | | | 726/23 |
| 2015/0089142 A1* | 3/2015 | Parks | ............... | G06F 12/0875 |
| | | | | 711/125 |
| 2015/0089204 A1* | 3/2015 | Henry | ............... | G06F 9/3001 |
| | | | | 712/221 |
| 2015/0339480 A1* | 11/2015 | Lutas | ............... | G06F 9/30058 |
| | | | | 726/22 |
| 2016/0004861 A1* | 1/2016 | Momot | ............... | G06F 21/552 |
| | | | | 726/23 |
| 2016/0328560 A1* | 11/2016 | Momot | ............... | G06F 9/30058 |
| 2016/0357958 A1* | 12/2016 | Guidry | ............... | G06F 21/53 |
| 2018/0157827 A1* | 6/2018 | Kang | ............... | G06F 21/577 |
| 2019/0317904 A1* | 10/2019 | Letey | ............... | H04L 63/02 |

\* cited by examiner

SYSTEM AND METHOD TO IDENTIFY A NO-OPERATION (NOP) SLED ATTACK

TECHNICAL FIELD

This disclosure relates in general to the field of information security, and more particularly, to the identification of a no-operation (NOP) sled attack.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth examples of apparatuses, methods, and systems relating to a system to help facilitate the identification of a no-operation (NOP) sled attack in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
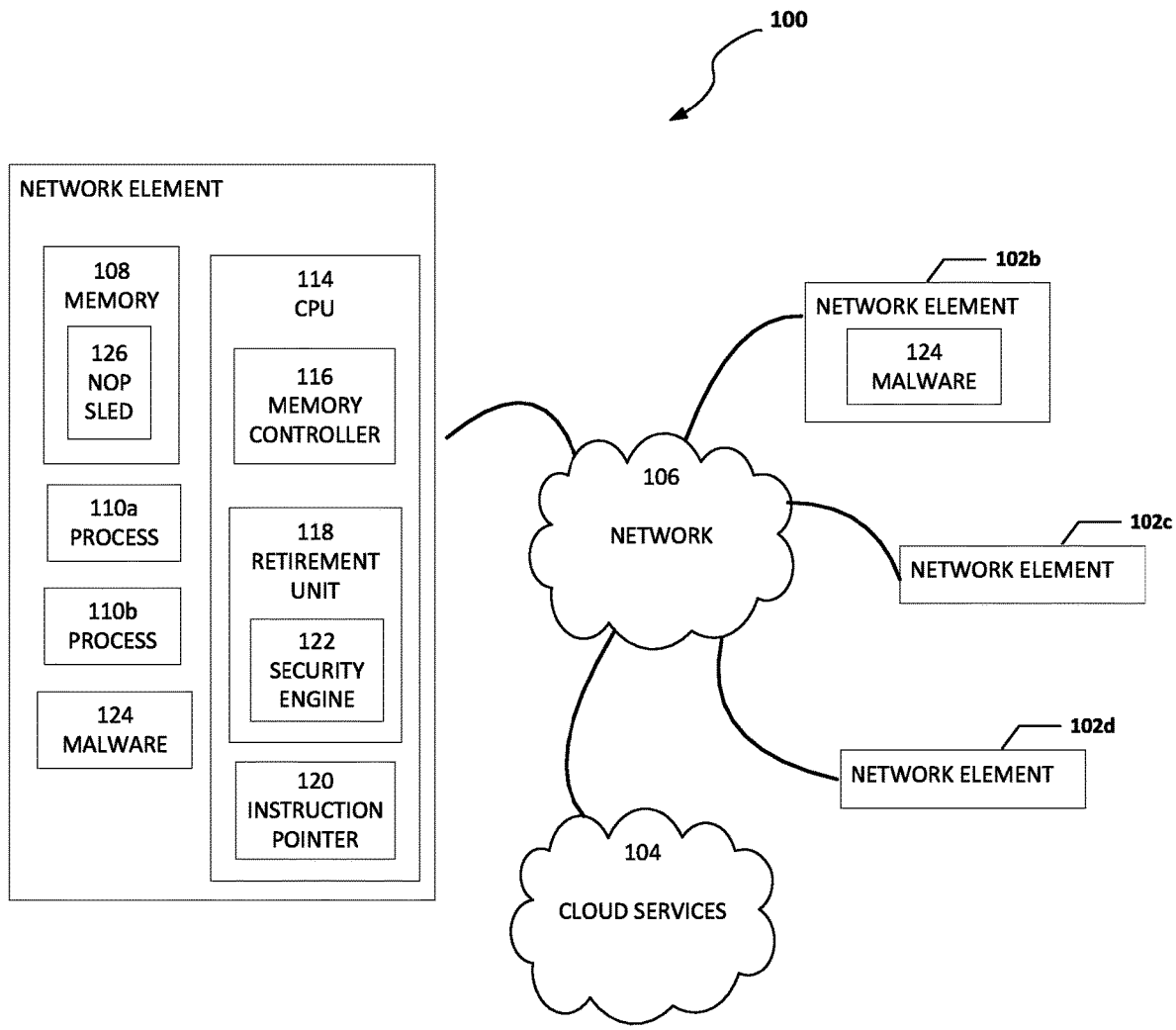
FIG. 1 is a simplified block diagram of a communication system to help facilitate the identification of a no-operation (NOP) sled attack in accordance with an embodiment of the present disclosure.

FIG. 1 is a simplified block diagram of a system 100 to help facilitate the identification of a no-operation (NOP) sled attack in accordance with an embodiment of the present disclosure. As illustrated in FIG. 1, an embodiment of system 100 can include network elements 102*a*-102*d* and cloud services 104. Network elements 102*a*-102*d* and cloud services 104 may be in communication with each other using network 106.

Each network element 102*a*-102*d* can include memory, one or more processes, and one or more computer processing units (CPU). Each CPU can include a memory controller, a retirement unit, and an instruction point. The retirement until can include a security engine. For example, as illustrated in FIG. 1, network element 102*a* includes memory 108, one or more processes 110*a* and 110*b*, and one or more CPUs 114. Each of processes 110*a* and 110*b* may be a computer program, function, virtual network function (VNF), etc. CPU 114 can include a memory controller 116, retirement unit 118, and an instruction pointer 120. Retirement unit 118 can include a security engine 122. In an example, network element 102*a* can include malware 124. Malware 124 may cause a NOP sled 126 to be located in memory 108.

Memory controller 116 (sometimes referred to as a memory chip controller or a memory controller unit) can be configured to manage the flow of data going to and from the computer's main memory. Memory controller 116 can also be configured as an interrupt handler and to initiate an interrupt or alert to a CPU (e.g., CPU 114) indicating a high-priority condition requiring the interruption of the current code the CPU is executing. Retirement unit 118 can be configured to handle results from an instruction pipeline. The instruction pipeline is a technique for implementing instruction-level parallelism within a single CPU. Pipelining attempts to keep every part of the CPU busy by dividing incoming instructions into a series of sequential steps performed by different CPU units with different parts of the instructions being processed in parallel. Modern CPUs typically execute many more instructions than a program flow needs. The instructions that were needed are retired while the instructions that were not needed are discarded. Retirement unit 118 retires the instructions that are actually executed and completed by the CPU meaning the results of the instruction are correct and visible in an architectural state.

Instruction pointer 120 (sometimes referred to as a program counter), is a special register in a CPU that holds the address of the next instruction to be executed. Computers need to keep track of where in memory the instructions that are being executed are located. This is normally done by the CPU using an instruction pointer, (the exact name of the instruction pointer depends on the architecture, but the concept generalizes across all architectures). The instruction pointer is continually incremented while instructions are executed from memory and the instruction pointer can also update whenever a jump instruction of some kind is executed.

In an example, system 100 can be configured to help identify when a NOP sled attack is occurring. More specifically, security engine 122 can be configured to determine when a series of instructions do not branch off or do not execute a memory operation each of which can be an indicator of a NOP sled (e.g., NOP sled 126). A NOP sled, NOP slide, or NOP ramp is a sequence of NOP instructions meant to "slide" the CPU's instruction execution flow to its final, desired destination whenever the system branches to a memory address anywhere in the NOP sled. In normal code execution, for example, execution of legitimate process 110a, a branch instruction and/or memory operation will typically occur at least once in about seventy-eight (78) instructions executed. The term "branch instruction" includes instructions that cause a computer to begin executing a different instruction sequence and thus deviate from its default behavior of executing instructions in order. The term "memory instruction" includes instructions to transfer data between registers and memory, to load an effective address, and for subroutine jumps.

Typically, NOP sleds do not have any branch and/or memory operations. This is because the branch and/or memory operations are difficult to craft for use in a NOP sled as memory addresses have to be valid and contain valid opcodes otherwise the branch or memory operation may cause a fault which would move the instruction pointer out of the NOP sled and prevent the instruction pointer from sliding to the desired code in the NOP sled. Once the instruction pointer lands in the NOP sled, the NOP sled wants to maintain control of the instruction pointer. This means that every byte in the NOP sled must be a valid CPU instruction, since the instruction pointer can start or initially point anywhere in the NOP sled. This makes using branch and memory operations difficult to include in a NOP sled as the branch and memory instructions require an address to be both CPU instruction executable and allow the NOP sled to maintain control of the instruction pointer (i.e., the instruction pointer remains within the NOP sled).

Elements of FIG. 1 may be coupled to one another through one or more interfaces employing any suitable connections (wired or wireless), which provide viable pathways for network (e.g., network 106) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting computers and computer networks from malicious and inadvertent exploitation by malicious software and devices. One way malicious operators can infect a host computer is to use a NOP sled. For example, malware 124 may cause NOP sled 126 to be created in memory 108.

Generally, a NOP-sled is a technique that hackers use to direct a CPU's instruction pointer to execute a malicious payload (e.g. shellcode). The NOP sled is a block that consists of a large sequence of meaningless executable instructions that ends with a small meaningful payload. The goal of the malware (e.g., malware 124) is to position these blocks in memory in hopes that a security vulnerability (e.g. heap corruption, use-after-free, buffer overflow, etc.) will point the instruction pointer into one of the blocks in the NOP sled. Once the block starts executing, the instruction sequence will "slide" the instruction pointer to the malicious payload to gain control of the system. Once the instruction pointer points to an address in the NOP sled (e.g., as a result of a heap corruption, use-after-free, buffer overflow, etc.), the NOP sled slides the instruction pointer to a malicious payload.

The NOP sled can potentially consist of any instruction that allows the instruction pointer to stay within the NOP sled. Single byte instructions work best in the NOP sled because the instruction pointer can land anywhere in the NOP sled and execution of the single byte instructions can slide the instruction pointer to the malicious payload. Multibyte instructions with a valid operant are sometimes used to hide the NOP sled as most current systems cannot detect a NOP sled with multi-byte instructions. What is needed is a system and method to identify a NOP sled.

A system and method to identify a NOP sled, as outlined in FIG. 1 can resolve these issues (and others). System 100 can be configured to calculate a ratio of single byte instructions to total instructions executed since the last reset of a single byte instruction counter and a total instruction counter. An alert (e.g., an interrupt such as a performance-counter related interrupt) can be generated when the ratio satisfies a configurable single byte instruction threshold. The single byte instruction threshold is configured by an administrator and depends on the system and the number of single byte instructions executed compared to the number of total instructions executed.

In addition, system 100 can be configured to calculate a ratio of branch instructions and/or memory instructions to the total number of instructions executed since a last reset of a branch instruction counter, a memory instruction counter, and a total instruction counter. An alert (e.g., an interrupt such as a performance-counter related interrupt) can be generated when the ratio satisfies a configurable branch/memory instruction threshold. The branch/memory instruction threshold is configured by an administrator and depends on the system. For example, some systems, such as high-performance computing, may not have very many branch or memory instructions so the threshold may be relatively high (e.g., 1000, 5000, etc. total instructions for every branch or memory instruction) while a personal computer will have several branch or memory instructions so the threshold may be (e.g., 50, 100, etc. total instructions for every branch or memory instruction).

NOP-sleds are designed to execute without faults or exceptions no matter where the instruction pointer lands in the NOP sled. Therefore, single byte instructions are typically used in NOP sleds. By calculating the ratio of single byte to total instructions executed since the last reset of the single byte counter and/or the ratio of branch instructions and/or memory instructions to the total number of instructions executed since the last reset of the branch instruction counter and the memory instruction counter, an interrupt (e.g., performance monitor interrupt) can be generated when a configurable threshold is reached or exceeded. The interrupt stops the execution of the NOP sled and helps to prevent a NOP sled attack. The mechanism calculating the ratio can be inside the CPU and therefore immutable. Once enabled, the NOP sled detection cannot be disabled until a reset of the single byte counter and/or the branch instruction counter and the memory instruction counter occur. Additionally, the thresholds can be reconfigured to adjust for nuisances or abnormalities of a system.

Turning to the infrastructure of FIG. 1, system 100 in accordance with an example embodiment is shown. Generally, system 100 can be implemented in any type or topology of networks. Network 106 represents a series of points or nodes of interconnected communication paths for receiving and transmitting packets of information that propagate through system 100. Network 106 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network elements 102*a*-102*d* can each be a desktop computer, laptop computer, mobile device, personal digital assistant, smartphone, tablet, network appliances, servers, routers, switches, gateways, bridges, load balancers, or any other suitable device, component, element, or object operable to exchange information in a network environment. Cloud services 104 is configured to provide cloud services to network elements 102*a*-102*d*. Cloud services may generally be defined as the use of computing resources that are delivered as a service over a network, such as the Internet. Typically, compute, storage, and network resources are offered in a cloud infrastructure, effectively shifting the workload from a local network to the cloud network. Network elements 102*a*-102*d* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with system 100, each of network elements 102*a*-102*d* and cloud services 104 can include memory elements (e.g., memory 108) for storing information to be used in the operations outlined herein. Each of network elements 102*a*-102*d* and cloud services 104 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of system 100, such as network elements 102a-102d and cloud services 104 may include software modules (e.g., security engine 122, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102d and cloud services 104 may include one or more processors (e.g., CPU 114) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
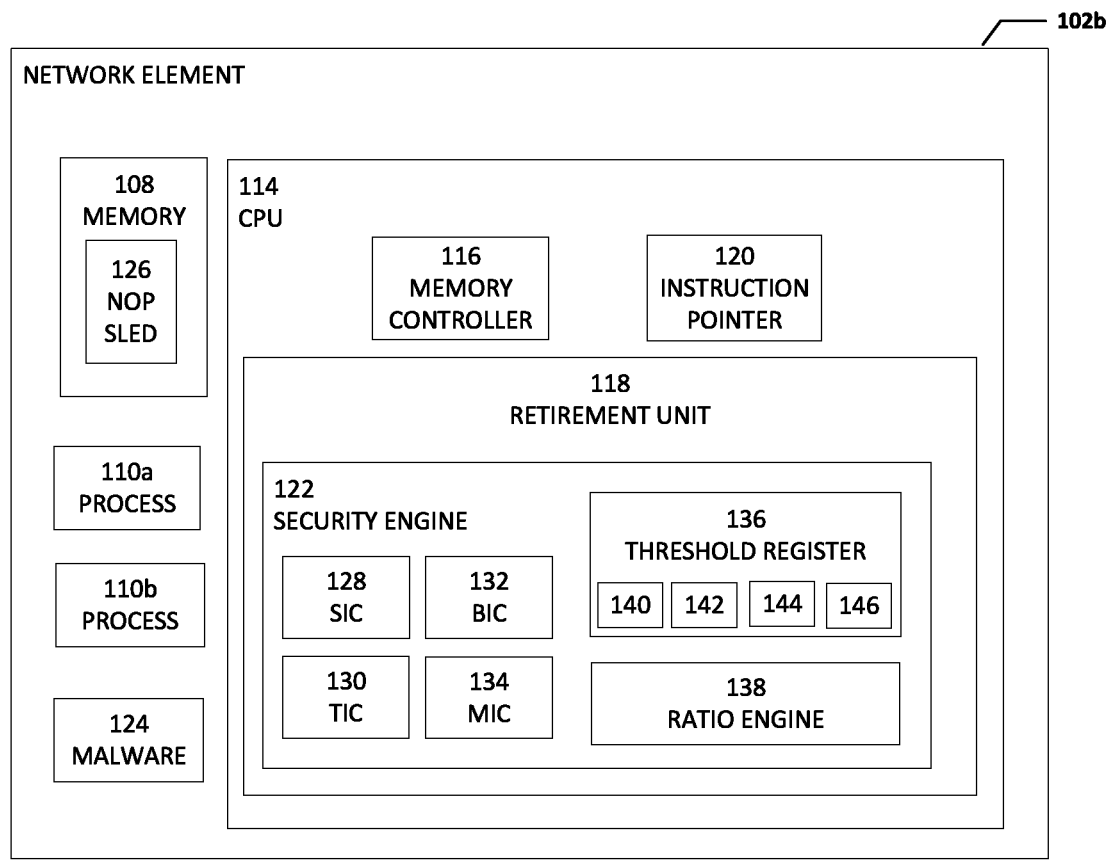
FIG. 2 is a simplified block diagram of a portion of a communication to help facilitate the identification of a NOP sled attack in accordance with an embodiment of the present disclosure.

Turning to FIG. 2, FIG. 2 is a simplified block diagram of a portion of a system 100 to help facilitate the identification of a NOP sled attack in accordance with an embodiment of the present disclosure. In an example, network element 102b can include memory 108, processes 110a and 110b, and CPU 114. CPU 114 can include memory controller 116, retirement unit 118, and instruction pointer 120. Retirement unit 118 can include security engine 122. Security engine 122 can include a single instruction counter 128, a total instruction counter 130, a branch instruction counter 132, a memory instruction counter 134, a threshold register 136, and a ratio engine 138. Threshold register 136 can include a single byte instruction threshold 140, a second single byte instruction threshold 142, a branch/memory instruction threshold 144, and a second branch/memory instruction threshold 146. In some examples, single byte instruction threshold 140, second single byte instruction threshold 142, branch/memory instruction threshold 144, and/or second branch/memory instruction threshold 146 may be stored in separate registers. In an example, network element 102a can include malware 124. Malware 124 may cause a NOP sled 126 to be located in memory 108.

Single instruction counter 128, total instruction counter 130, branch instruction counter 132, and memory instruction counter 134, can have an initial value of zero or some other initial value. Upon a reset of single instruction counter 128, total instruction counter 130, branch instruction counter 132, and memory instruction counter 134, each counter will be reset to zero or their initial value. During operation, single instruction counter 128 can include a value that represents the number of single instructions received by retirement unit 118 since the last reset of the counters. In addition, during operation, total instruction counter 130 can include a value that represents the total number of instructions received by retirement unit 118 since the last reset of the counters. Also, branch instruction counter 132 can include a value that represents the number of branch instructions received by retirement unit 118 since the last reset. Further, memory instruction counter 134 can include a value that represents the number of memory instructions received by retirement unit 118 since the last reset of the counters. Single byte instruction threshold 140, second single byte instruction threshold 142, branch/memory instruction threshold 144, and second branch/memory instruction threshold 146 can each include a value or values that represent the thresholds used to help determine when a NOP sled may be detected or present in memory 108. Using the values from single instruction counter 128, total instruction counter 130, branch instruction counter 132, and/or memory instruction counter 134, ratio engine 138 is configured to determine ratios that are used to compare with the values in single byte instruction threshold 140, second single byte instruction threshold 142, branch/memory instruction threshold 144, and/or second branch/memory instruction threshold 146 to determine when a NOP sled may be detected or present in memory 108.

Ratio engine 138 is located inside CPU 114 and is therefore immutable. Once enabled, ratio engine 138 cannot be disabled until a reset of single instruction counter 128, total instruction counter 130, branch instruction counter 132, and memory instruction counter 134 occurs. The values in single byte instruction threshold 140, second single byte instruction threshold 142, branch/memory instruction threshold 144, and second branch/memory instruction threshold 146 can be reconfigured to adjust for nuisances or abnormalities of a system by an administrator during startup or a reset of network element 102b.

In an example, system 100 can leverage existing performance monitoring functionality and add single instruction counter 128, total instruction counter 130, branch instruction counter 132, and memory instruction counter 134 into retirement unit 118 of CPU 114. When network element 102b is first turned on or becomes active, security engine 122 is configured with default or initial values for single instruction counter 128, total instruction counter 130, branch instruction counter 132, memory instruction counter 134, single byte instruction threshold 140, second single byte instruction threshold 142, branch/memory instruction threshold 144, and second branch/memory instruction threshold 146 and then enabled. Once enabled, disablement can only happen upon reset of the counters. This helps prevent circumvention of security engine 122 and the detection of malware 124 and NOP sled 126.

In an example, if an executed instruction received by retirement unit 118 is a single byte instruction, single instruction counter 128 is incremented. Total instruction counter 130 is always incremented when an instruction is executed and received by retirement unit 118 to keep count of the total number of executed instructions. Ratio engine 138 can calculate a ratio between the number of single byte instructions received and the total number of instructions received. For example, the ratio can be calculated as single byte instructions divided by the total number of instructions times one hundred (100) (RATIO=SIC/TIC*100). The ratio can be compared to single byte instruction threshold 140 in threshold register 136. If single byte instruction threshold 140 is satisfied, an interrupt can be asserted and memory controller 116 (e.g., acting as an interrupt handler) can take the appropriate action (e.g., verify false positives, halt execution, reset state, etc.). If single byte instruction threshold 140 was not satisfied or exceeded, ratio engine 138 can be used to help ensure that the difference or distance between the value in single instruction counter 128 and the value in total instruction counter 130 does not become greater than second single byte instruction threshold 142 (e.g., one hundred (100)). Second single byte instruction threshold 142 can help ensure the ratio between the number of single byte instructions received and the total number of instructions received remains effective. For example, if the system has been running and code has been executing for some time, the total number of instructions received may become a much larger number than the single byte instructions received. If the total number of instructions received becomes too big, the number of single byte instructions received basically becomes meaningless in the ratio between the number of single byte instructions received and the total number of instructions received. If the difference or distance between the value in single instruction counter 128 and the value in total instruction counter 130 does become greater than second single byte instruction threshold 142, then single instruction counter 128 and total instruction counter 130 can be reset.

In another example, if an executed instruction received by retirement unit 118 is a branch instruction, branch instruction counter 132 is incremented. If the executed instruction received by retirement unit 118 is a memory instruction, memory instruction counter 134 is incremented. Total instruction counter 130 is always incremented when an instruction is executed and received by retirement unit 118 to keep count of the total number of executed instructions. Ratio engine 138 can calculate a ratio between the number of received branch instructions, memory instructions, and total instructions and the ratio can be compared to branch/memory instruction threshold 144 in threshold register 136. For example, the value in branch instruction counter 132 can be added to the value in memory instruction counter 134 and the result can be subtracted from the value in total instruction counter 130 (T−(BIC+MIC)). If the result satisfies branch/memory instruction threshold 144, then a trigger is executed (e.g., memory controller 116 can initiate the trigger). The trigger can be any event that will stop the NOP sled from executing and can be an interrupt. The trigger may be performed using existing performance monitor counters such as an existing performance monitor interrupt. After the trigger is executed, total instruction counter 130, branch instruction counter 132, memory instruction counter 134 are cleared or reset. Second branch/memory instruction threshold 146 can be set to reduce false negatives from a crafty NOP sled. In most circumstances, second branch/memory instruction threshold 146 should be set to one (1) as most NOP sleds do not include any branch or memory instructions. However, a skilled attacker may be able to create a NOP sled with branch or memory instructions so that second branch/memory instruction threshold 146 never gets triggered and second branch/memory instruction threshold 146 can be set higher than one (1) (e.g., to allow for ten (10) or some other number of branch or memory operations) before resetting.

Figure 3:
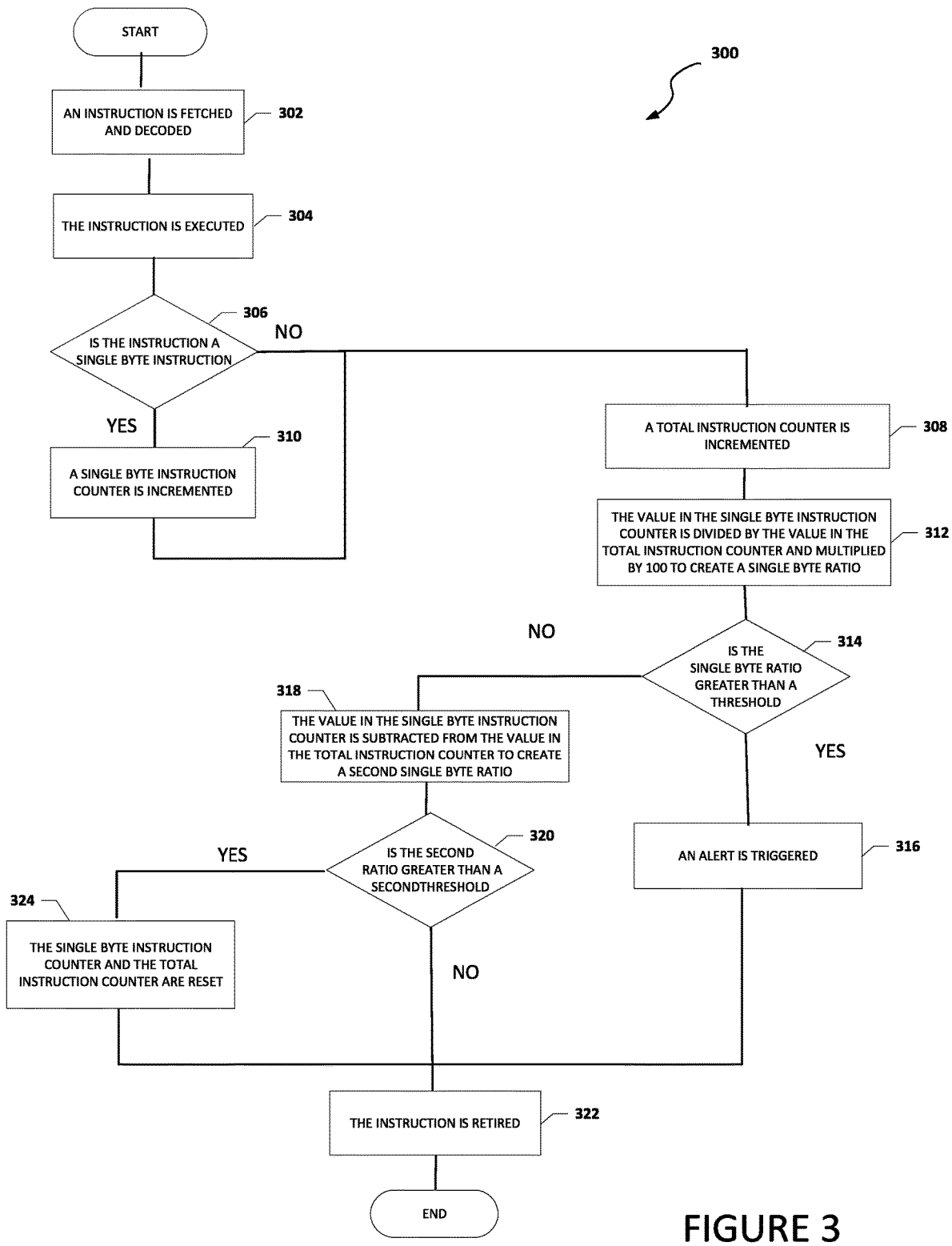
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the identification of a NOP sled attack, in accordance with an embodiment. In an embodiment, one or more operations of flow 300 may be performed by security engine 122 and ratio engine 138. At 302, an instruction is fetched and decoded. At 304, the instruction is executed. At 306, the system determines if the instruction is a single byte instruction. If the instruction is not a single byte instruction, then a total instruction counter is incremented, as in 308. If the instruction is a single byte instruction, then a single byte instruction counter is incremented as in 310, and the total instruction counter is incremented, as in 308. At 312, the value in the single byte instruction counter is divided by the value in the total instruction counter and multiplied by one hundred (100) to create a single byte ratio. At 314, the system determines if the single byte ratio is greater than a threshold (e.g., single byte instruction threshold 140). If the single byte ratio is greater than a threshold, then an alert is triggered, as in 316. The single byte ratio helps to determine when the system is in a NOP sled that includes several single byte instructions. The alert is to inform the system that a NOP sled was detected or the possibility that the system may be under a NOP sled attack. In an example, the alert can trigger an interrupt to stop the NOP sled. In a specific example, the alert can be or can trigger a performance monitor interrupt. At 322, the instruction is retired.

If the single byte ratio is not greater than a threshold, then the value in the single byte instruction counter is subtracted from the value in the total instruction counter to create a second single byte ratio, as in 318. At 320, the system determines if the second single byte ratio is greater than a second single byte instruction threshold (e.g., second single byte instruction threshold 142). If the second single byte ratio is not greater than the second single byte instruction threshold, then the instruction is retired, as in 322. If the second single byte ratio is greater than the second single byte instruction threshold, then the single byte instruction counter and the total instruction counter are reset, as in 324 and the instruction is retired, as in 322. The second single byte instruction threshold check is to make sure the ratio between the number of single byte instructions received and the total number of instructions remains effective and does not become relatively zero (e.g., the total number of instructions received becomes very large and the number of single byte instructions received basically becomes meaningless in the ratio between the number of single byte instructions received and the total number of instructions received).

Figure 4A:
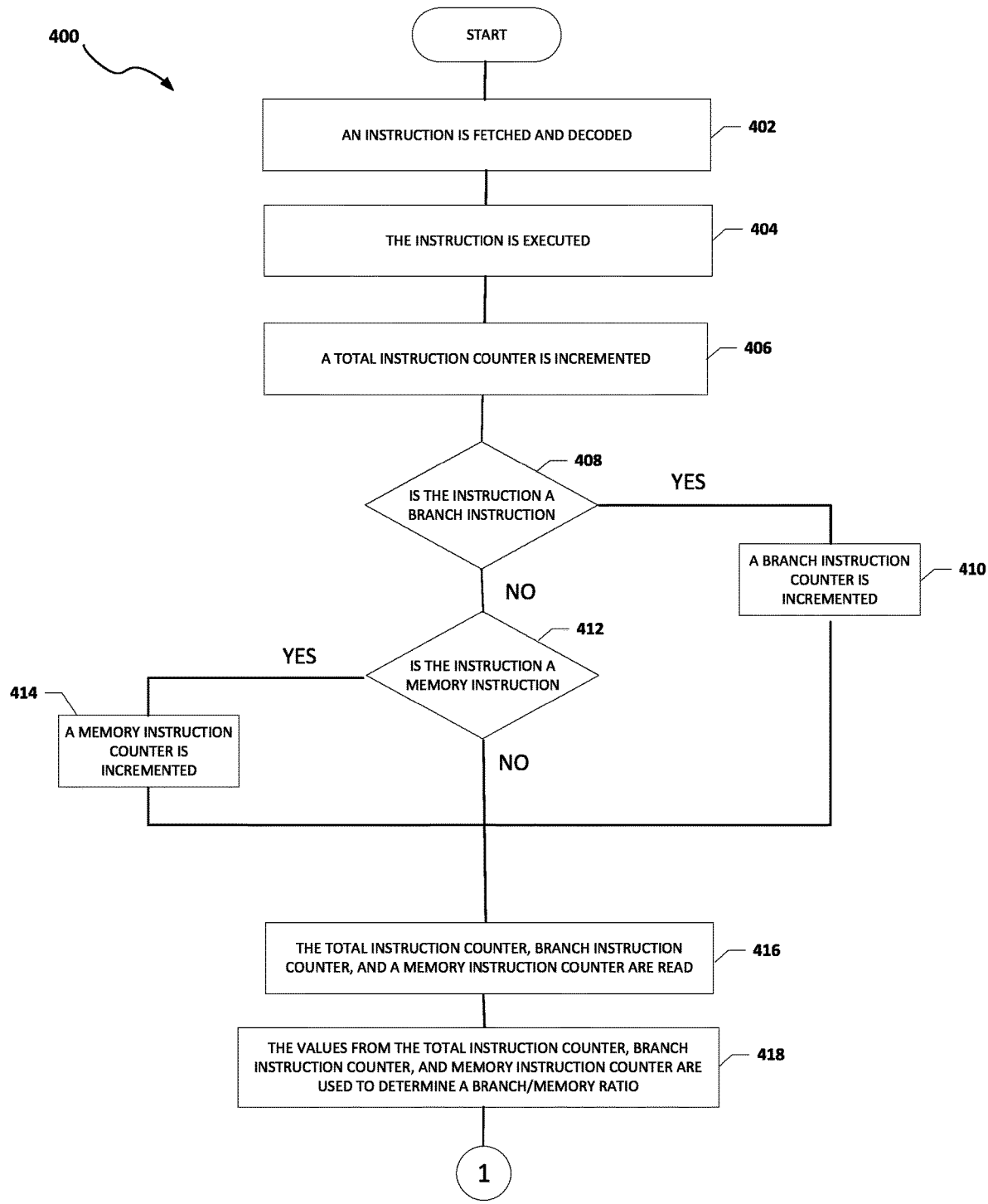
FIGS. 4A and 4B are simplified flowcharts illustrating potential operations that may be associated with the communication system in accordance with an embodiment.
Figure 4B:
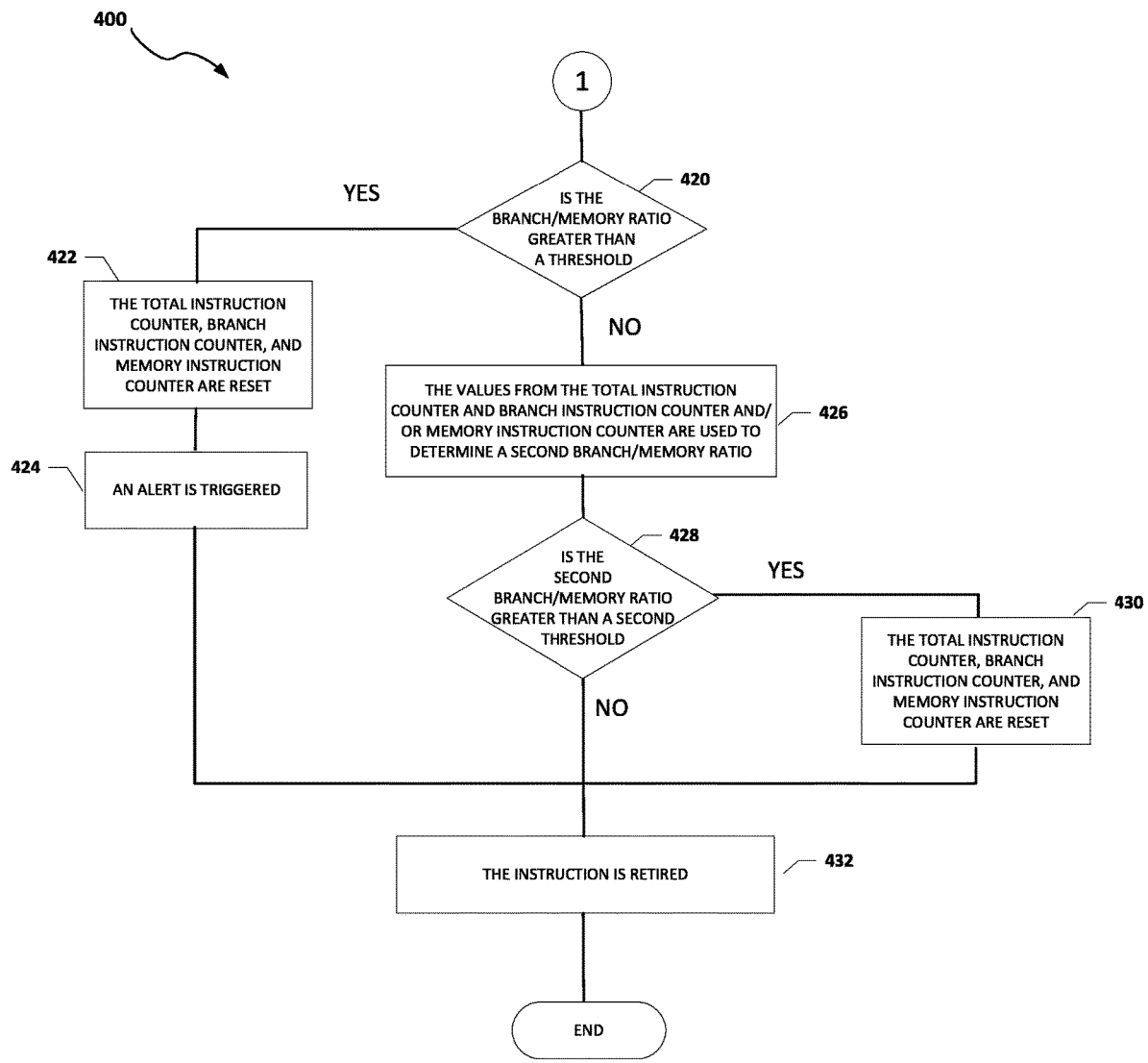

Turning to FIGS. 4A and 4B, FIGS. 4A and 4B are an example flowchart illustrating possible operations of a flow 400 that may be associated with the identification of a NOP sled attack, in accordance with an embodiment. In an embodiment, one or more operations of flow 400 may be performed by security engine 122 and ratio engine 138. As illustrated in FIG. 4A, at 402, an instruction is fetched and decoded. At 404, the instruction is executed. At 406, a total instruction counter is incremented. At 408, the system determines if the instruction is a branch instruction. If the instruction is a branch instruction, then a branch instruction counter is incremented, as in 410. If the instruction is not a branch instruction, then the system determines if the instruction is a memory instruction, as in 412. If the instruction is a memory instruction, then a memory instruction counter in incremented, as in 414. If the instruction is not a memory instruction, then the total instruction counter, the branch instruction counter, and the memory instruction counter are read, as in 416. At 418, the values from the total instruction counter, branch instruction counter, and memory instruction counter are used to determine a branch/memory ratio. For example, the system can use the values from the total instruction counter, branch instruction counter, and memory instruction counter to create a ratio. In a specific example, the value in branch instruction counter 132 can be added to the value in memory instruction counter 134 and the result can be subtracted from the value in total instruction counter 130 (T−(BIC+MIC)) to create the branch/memory ratio.

As illustrated in FIG. 4B, at 420, the system determines if the branch/memory ratio is greater than a threshold (e.g., branch/memory instruction threshold 144). If the branch/memory ratio is greater than a threshold, then the total instruction counter, branch instruction counter, and memory instruction counter are reset, as in 422. In an example, the value of the counters can be reset to a zero value. The total instruction counter, branch instruction counter and memory instruction counter are reset to keep the values of the counters from becoming too large. At 424, an alert is triggered. The alert is to inform the system that a NOP sled was possibly detected or the possibility that the system may be under a NOP sled attack. In an example, the alert can trigger an interrupt to stop the NOP sled. In a specific example, the alert can be or can trigger a performance monitor interrupt. The interrupt can cause the instruction pointer to move out of the NOP sled and point to a known location (e.g., a performance monitor handler located at a trusted memory location). At 432, the instruction is retired.

If the branch/memory ratio is not greater than a threshold, then the values from the total instruction counter and branch instruction counter and/or memory instruction counter are used to determine a second branch/memory ratio, as in 426. In an example, the value in total instruction counter and the value in branch instruction counter can be used to determine the ratio. In another example, the value in the total instruction counter and the value in memory instruction counter can be used to determine the ratio. In yet another example, the value in total instruction counter, the value in branch instruction counter, and the value in memory instruction counter can be used to determine the ratio. At 428, the system determines if the second branch/memory ratio is greater than a second threshold (e.g., second branch/memory instruction threshold 146). If the second branch/memory ratio is greater than the second threshold, then the total instruction counter, branch instruction counter and memory instruction counter are reset, as in 430 and the instruction is retired, as in 432. This helps the security engine account for crafty NOP sleds that may contain branch or memory instructions and helps to reduce false negatives. In an example, the total instruction counter, branch instruction counter and memory instruction counter are reset only after the second threshold is reached. In an example, the second threshold value is one however the second threshold value can be more to accommodate for more sophisticated NOP sleds. If the second threshold value is not greater than a threshold, then the instruction is retired, as in 432.

Figure 5A:
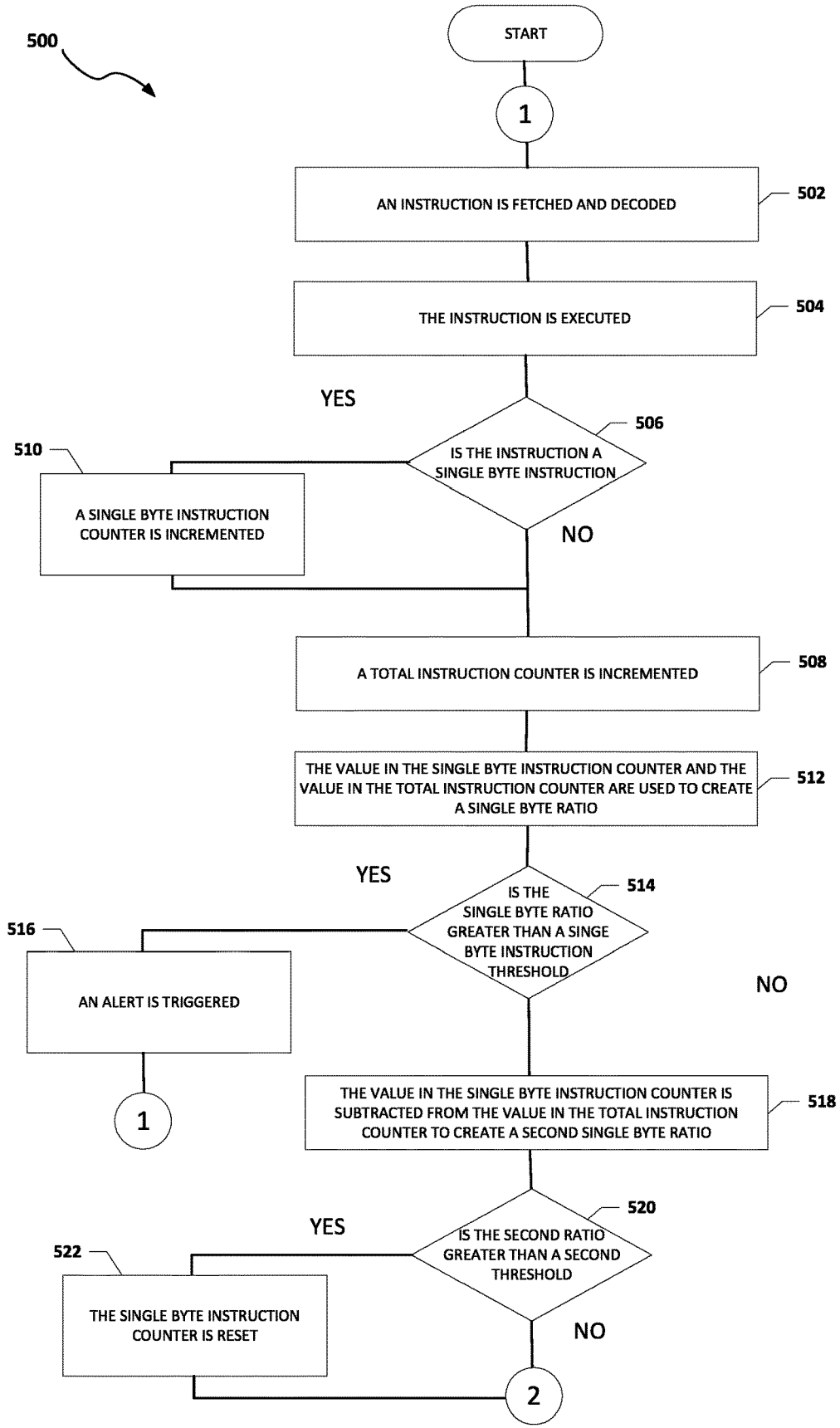
FIGS. 5A and 5B are simplified flowcharts illustrating potential operations that may be associated with the communication system in accordance with an embodiment.
Figure 5B:
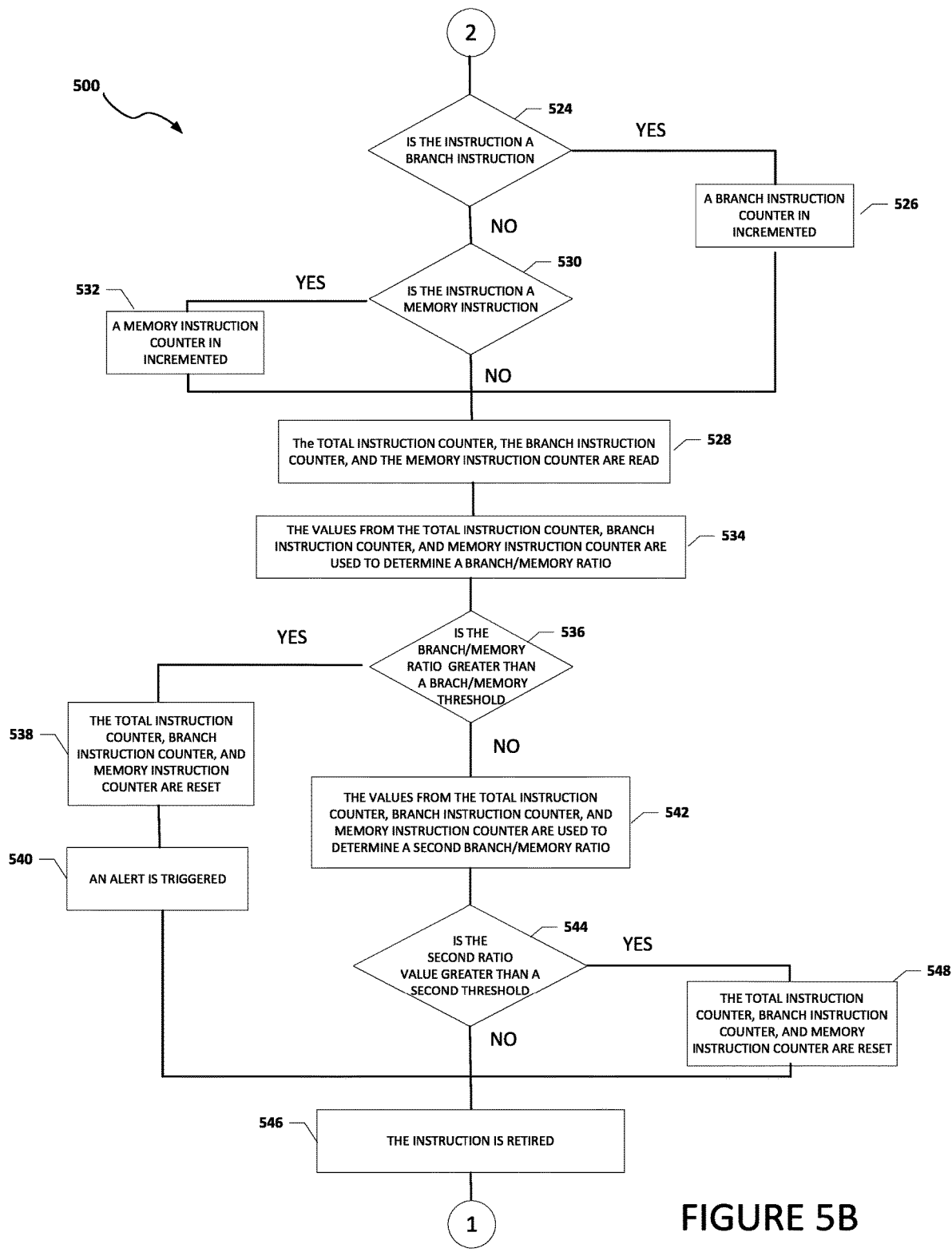

Turning to FIGS. 5A and 5B, FIGS. 5A and 5B are an example flowchart illustrating possible operations of a flow 500 that may be associated with the identification of a NOP sled attack, in accordance with an embodiment. In an embodiment, one or more operations of flow 500 may be performed by security engine 122 and ratio engine 138. As illustrated in FIG. 5A, at 502, an instruction is fetched and decoded. At 504, the instruction is executed. At 506, the system determines if the instruction is a single byte instruction. If the instruction is not a single byte instruction, then a total instruction counter is incremented, as in 508. If the instruction is a single byte instruction, then a single byte instruction counter is incremented as in 510, and the total instruction counter is incremented, as in 508. At 512, the value in the single byte instruction counter and the value in the total instruction counter are used to create a single byte ratio. At 514, the system determines if the single byte ratio is greater than a single byte instruction threshold (e.g., single byte instruction threshold 140). If the single byte ratio is greater than the single byte instruction threshold, then an alert is triggered, as in 516 and the system returns to 502 where a (new) instruction is fetched and decoded. In an example, before the system returns to 502 where a (new) instruction is fetched and decoded, the instruction is retired as in 546 in FIG. 5B. The single byte ratio helps to determine when the system is in a NOP sled that includes several single byte instructions. The alert is to inform the system that a NOP sled was detected or the possibility that the system may be under a NOP sled attack. In an example, the alert can trigger an interrupt to stop the NOP sled. In a specific example, the alert can be or can trigger a performance monitor interrupt.

If the single byte ratio is not greater than the single byte instruction threshold, then the value in the single byte instruction counter is subtracted from the value in the total instruction counter to create a second single byte ratio, as in 518. At 520, the system determines if the second single byte ratio is greater than a second single byte instruction threshold (e.g., second single byte instruction threshold 142). If the second single byte ratio is greater than the second single byte instruction threshold, then the single byte instruction counter is reset, as in 522. As illustrated in FIG. 5B, at 524, the system determines if the instruction is a branch instruction.

Going back to FIG. 5A, if the second single byte ratio is not greater than the second single byte instruction threshold, then as illustrated in FIG. 5B, the system determines if the instruction is a branch instruction, as in 524. If the instruction is a branch instruction, then a branch instruction counter is incremented, as in 526. If the instruction is not a branch instruction, then the system determines if the instruction is a memory instruction, as in 530. If the instruction is a memory instruction, then a memory instruction counter is incremented, as in 532 and the total instruction counter, branch instruction counter, and memory instruction counter are read, as in 528. If the instruction is not a memory instruction, then the total instruction counter, branch instruction retired counter, and memory instruction retired counter are read, as in 528.

At 534, the values from the total instruction counter, branch instruction counter and memory instruction counter are used to determine a branch/memory to total instruction ratio. At 536, the system determines if the branch/memory to total instruction ratio is greater than a branch/memory instruction threshold (e.g., branch/memory instruction threshold 144). If the branch/memory to total instruction ratio is greater than the branch/memory instruction threshold, then the total instruction counter, branch instruction counter and memory instruction counter are reset, as in 538. In an example, the value of the counters can be reset to a zero value. The total instruction counter, branch instruction counter and memory instruction counter are reset to enable the threshold for the next section of execution. At 540, an alert is triggered, the instruction is retired as in 546, and the system returns to 502 where a (new) instruction is fetched and decoded. The alert is to inform the system that a NOP sled was detected or the possibility that the system may be under a NOP sled attack. In an example, the alert can trigger an interrupt to stop the NOP sled. In a specific example, the alert can be or can trigger a performance monitor interrupt.

Going back to 536, if the branch/memory ratio is not greater than the branch/memory instruction threshold, then the values from the total instruction counter, branch instruction counter and memory instruction counter are used to determine a second branch/memory ratio, as in 542. At 544, the system determines if the second branch/memory ratio is greater than a second branch/memory instruction threshold (e.g., second branch/memory instruction threshold 146). If the second branch/memory ratio is greater than the second branch/memory instruction threshold, then the total instruction counter, branch instruction counter and memory instruction counter are reset, as in 548, the instruction is retired as in 546, and the system returns to 502 where a (new) instruction is fetched and decoded. If the second branch/memory ratio is not greater than the second branch/memory instruction threshold, then the instruction is retired, as in 546 and the system returns to 502 where a (new) instruction is fetched and decoded.

Figure 6:
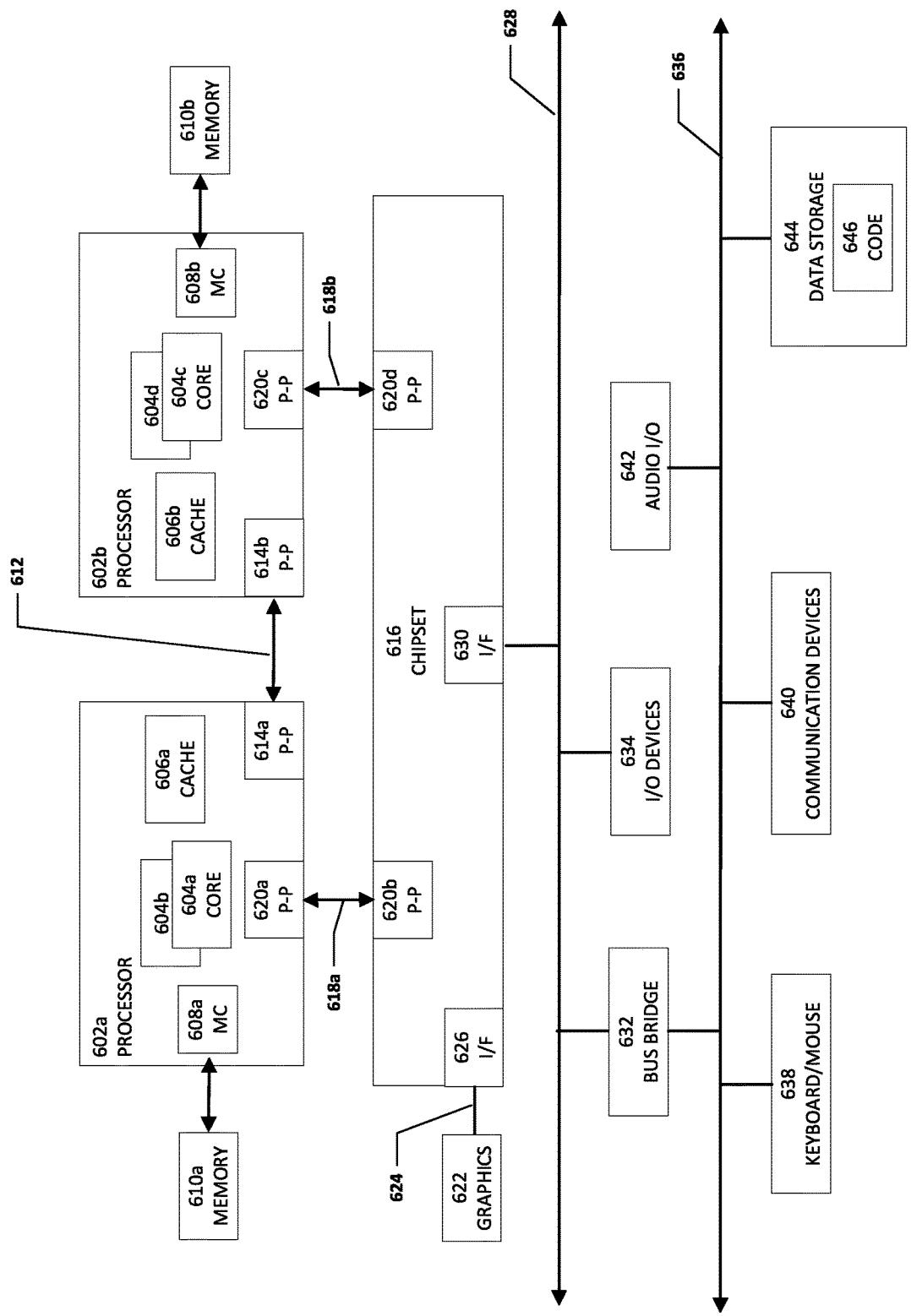
FIG. 6 is a block diagram illustrating an example computing system that is arranged in a point-to-point configuration in accordance with an embodiment.

Turning to FIG. 6, FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of system 100 may be configured in the same or similar manner as computing system 600.

As illustrated in FIG. 6, system 600 may include several processors, of which only two, processors 602a and 602b, are shown for clarity. While two processors 602a and 602b are shown, it is to be understood that an embodiment of system 600 may also include only one such processor. Processors 602a and 602b may each include a set of cores (i.e., processors cores 604a and 604b and processors cores 604c and 604d) to execute multiple threads of a program. The cores may be configured to execute instruction code in a manner similar to that discussed above with reference to FIGS. 1-8. Each processor 602a and 602b may include at least one shared cache 606a and 606b respectively. Shared caches 606a and 606b may each store data (e.g., instructions) that are utilized by one or more components of processors 602a and 602b, such as processor cores 604a and 604b of processor 602a and processor cores 604c and 604d of processor 602b.

Processors 602a and 602b may also each include integrated memory controller logic (MC) 608a and 608b respectively to communicate with memory elements 610a and 610b. Memory elements 610a and/or 610b may store various data used by processors 602a and 602b. In alternative embodiments, memory controller logic 608a and 608b may be discrete logic separate from processors 602a and 602b.

Processors 602a and 602b may be any type of processor and may exchange data via a point-to-point (PtP) interface 612 using point-to-point interface circuits 614a and 614b respectively. Processors 602a and 602b may each exchange data with a chipset 616 via individual point-to-point interfaces 618a and 618b using point-to-point interface circuits 620a-620d. Chipset 616 may also exchange data with a high-performance graphics circuit 622 via a high-performance graphics interface 624, using an interface circuit 626, which could be a PtP interface circuit. In alternative embodiments, any or all of the PtP links illustrated in FIG. 6 could be implemented as a multi-drop bus rather than a PtP link.

Chipset 616 may be in communication with a bus 628 via an interface circuit 630. Bus 628 may have one or more devices that communicate over it, such as a bus bridge 632 and I/O devices 634. Via a bus 636, bus bridge 632 may be in communication with other devices such as a keyboard/mouse 638 (or other input devices such as a touch screen, trackball, etc.), communication devices 640 (such as modems, network interface devices, or other types of communication devices that may communicate through a network), audio I/O devices 642, and/or a data storage device 644. Data storage device 644 may store code 646, which may be executed by processors 602a and/or 602b. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
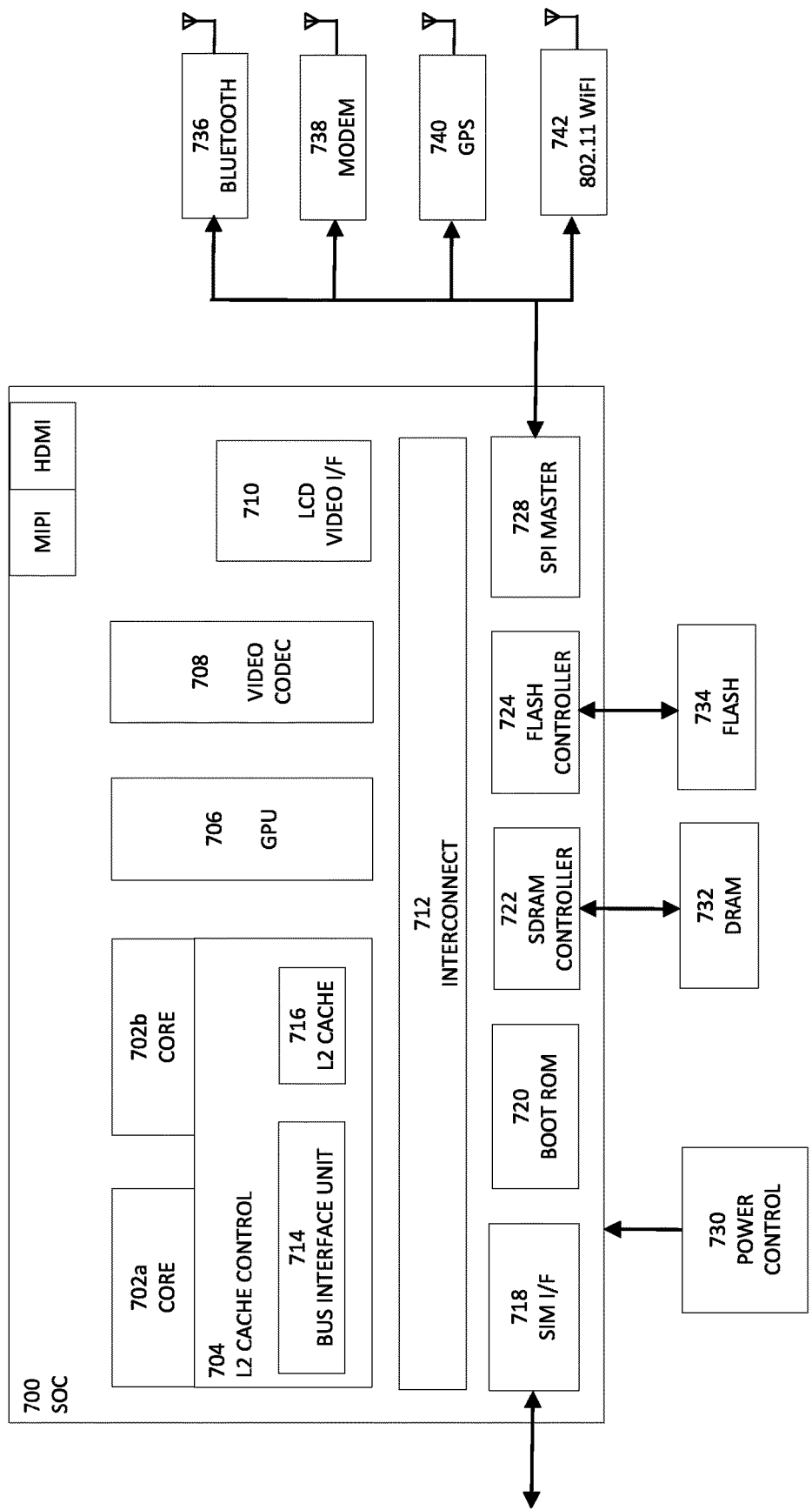
FIG. 7 is a simplified block diagram associated with an example ARM ecosystem system on chip (SOC) of the present disclosure.

Turning to FIG. 7, FIG. 7 is a simplified block diagram associated with an example ecosystem SOC 700 of the present disclosure. At least one example implementation of the present disclosure can include the device pairing in a local network features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ecosystem SOC 700 may include multiple cores 702a and 702b, an L2 cache control 704, a graphics processing unit (GPU) 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/high-definition multimedia interface (HDMI) links that couple to an LCD.

Ecosystem SOC 700 may also include a subscriber identity module (SIM) I/F 718, a boot read-only memory (ROM) 720, a synchronous dynamic random-access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 0138, a global positioning system (GPS) 740, and an 802.11 Wi-Fi 742.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
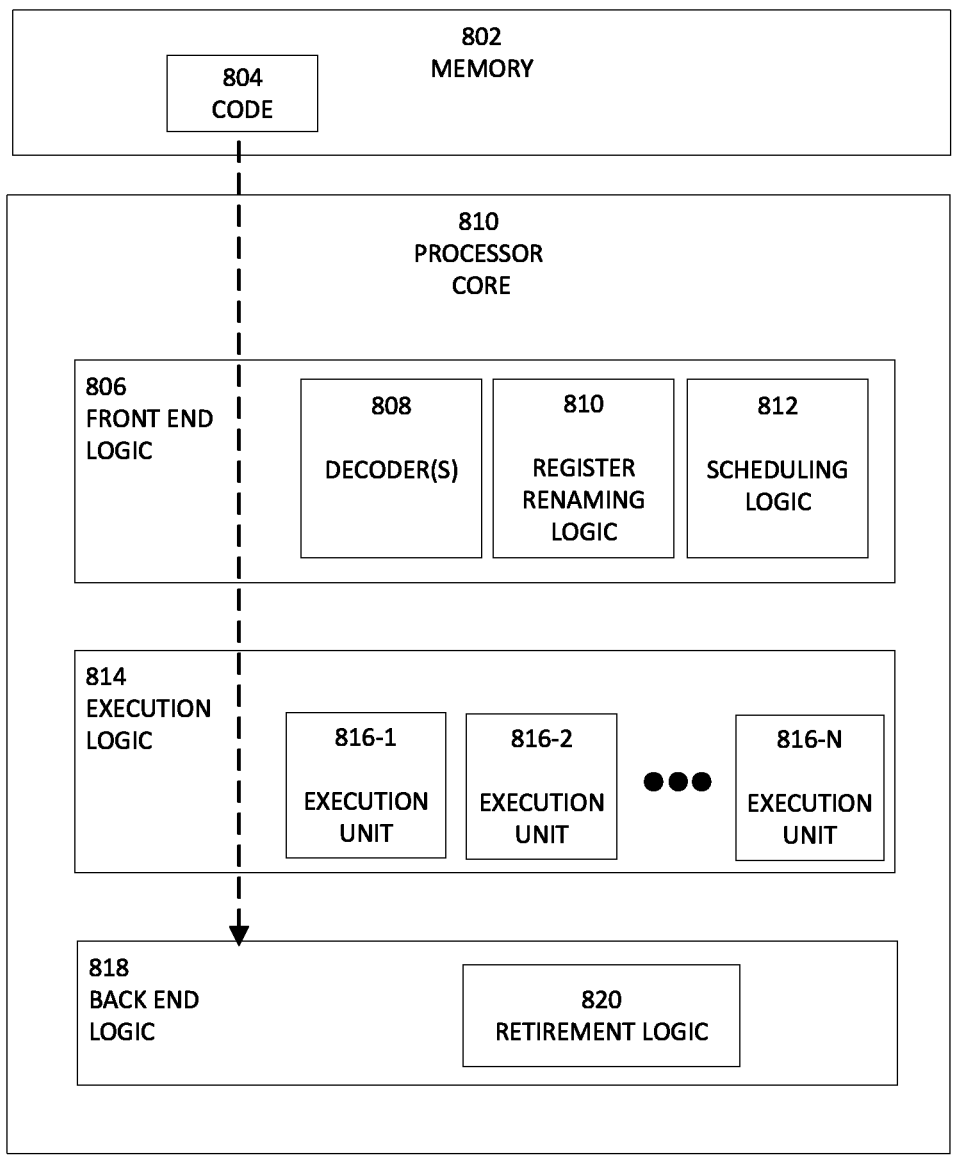
FIG. 8 is a block diagram illustrating an example processor core in accordance with an embodiment.

Turning to FIG. 8, FIG. 8 illustrates a processor core 800 according to an embodiment. Processor core 800 may be the core for any type of processor, such as a micro-processor, an embedded processor, a digital signal processor (DSP), a network processor, or other device to execute code.

Although only one processor core 800 is illustrated in FIG. 8, a processor may alternatively include more than one of the processor core 800 illustrated in FIG. 8. For example, processor core 800 represents one example embodiment of processors cores 604a-604d shown and described with reference to processors 602a and 602b of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations in the preceding flow diagrams (i.e., FIGS. 3-5) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor cause the at least one processor to receive an instruction, increment a value in a total instruction counter, increment a value in a branch instruction counter when the instruction is a branch instruction, increment a value in a memory instruction counter when the instruction is a memory instruction, create a ratio based on the value in the total instruction counter and the value in the branch instruction counter or the value in the memory instruction counter, and trigger an alert when the ratio satisfies a threshold.

In Example C2, the subject matter of Example C1 can optionally include where the alert is an interrupt.

In Example C3, the subject matter of any one of Examples C1-C2 can optionally include where the alert is a performance monitor interrupt.

In Example C4, the subject matter of any one of Examples C1-C3 can optionally include one or more instructions that when executed by the least one processor, causes the least one processor to increment a value in a single byte instruction counter when the instruction is a single byte instruction, create a single byte ratio based on the value in the total instruction counter and the single byte instruction counter, and trigger the alert when the single byte ratio satisfies a single byte instruction threshold.

In Example C5, the subject matter of any one of Examples C1-C4 can optionally include can optionally include one or more instructions that when executed by the least one processor, causes the least one processor to create a branch/memory to total instruction ratio based on the value in the total instruction counter, the value in the branch instruction counter, and the value in the memory instruction counter.

In Example C6, the subject matter of any one of Examples C1-C5 can optionally include where the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

In Example C7, the subject matter of any one of Example C1-C6 can optionally include where the ratio indicates a presence of a NOP sled attack.

In Example A1, an electronic device can include memory, at least one processor, and a security engine. The security engine is configured to cause the at least one processor to receive an instruction, increment a value in a total instruction counter, increment a value in a branch instruction counter when the instruction is a branch instruction, create a ratio based on the value in the total instruction counter and the value in the branch instruction counter or the value in the memory instruction counter, and trigger an alert when the ratio satisfies a threshold.

In Example, A2, the subject matter of Example A1 can optionally include where the alert is an interrupt.

In Example A3, the subject matter of any one of Examples A1-A2 can optionally include where the security engine if further configured to cause the processor to increment a value in a single byte instruction counter when the instruction is a single byte instruction, create a single byte ratio based on the value in the total instruction counter and the single byte instruction counter, and trigger the alert when the single byte ratio satisfies a single byte instruction threshold.

In Example A4, the subject matter of any one of Examples A1-A3 can optionally include where the security engine if further configured to cause the processor to increment a value in a memory instruction counter when the instruction is a memory instruction and create a branch/memory to total instruction ratio based on the value in the total instruction counter, the value in the branch instruction counter, and the value in the memory instruction counter.

In Example A5, the subject matter of any one of Examples A1-A4 can optionally include where the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

In Example A6, the subject matter of any one of Examples A1-A5 can optionally include where the ratio indicates a presence of a NOP sled attack.

In Example A7, the subject matter of any one of Examples A1-A6 can optionally include where the security engine is located in a retirement unit of a computer processing unit.

Example M1 is a method including receiving an instruction, at a retirement unit of a computer processing unit, incrementing a value in a total instruction counter, incrementing a value in a branch instruction counter when the instruction is a branch instruction, creating a ratio based on the value in the total instruction counter and the value in the branch instruction counter, and triggering an alert at the computer processing unit when the ratio satisfies a threshold.

In Example M2, the subject matter of Example M1 can optionally include where the alert is an interrupt.

In Example M3, the subject matter of any one of the Examples M1-M2 can optionally include where the alert is a performance monitor interrupt.

In Example M4, the subject matter of any one of the Examples M1-M3 can optionally include incrementing a value in a memory instruction counter when the instruction is a memory instruction and creating a branch/memory to total instruction ratio based on the value in the total instruction counter, the value in the branch instruction counter, and the value in the memory instruction counter.

In Example M5, the subject matter of any one of the Examples M1-M4 can optionally include where the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

In Example M6, the subject matter of any one of the Examples M1-M5 can optionally include incrementing a value in a single byte instruction counter when the instruction is a single byte instruction, creating a single byte ratio based on the value in the total instruction counter and the single byte instruction counter, and triggering the alert when the single byte ratio satisfies a single byte instruction threshold.

In Example M7, the subject matter of any one of the Examples M1-M6 can optionally include where the ratio indicates a presence of a NOP sled attack.

Example S1 is a system for an identification of a no-operation (NOP) sled attack, the system including a computer processing unit, where the computer processing unit includes a retirement unit and a security engine located in the retirement unit. The security engine configured to receive an instruction, increment a value in a total instruction counter, increment a value in a branch instruction counter when the instruction is a branch instruction, increment a value in a memory instruction counter when the instruction is a memory instruction, create a ratio based on the value in the total instruction counter and the value in the branch instruction counter and the value in the memory instruction counter, and trigger an alert when the ratio satisfies a threshold, where the alert provides the identification of a NOP sled attack.

In Example S2, the subject matter of Example S1 can optionally include where the alert is an interrupt.

In Example S3, the subject matter of any of the Examples S1-S2 can optionally include where the security engine is further configured to increment a value in a single byte instruction counter when the instruction is a single byte instruction, create a single byte ratio based on the value in the total instruction counter and the single byte instruction counter, and trigger the alert when the single byte ratio satisfies a single byte instruction threshold.

In Example S4, the subject matter of any of the Examples S1-S3 can optionally include where the total instruction counter, the branch instruction counter, and the memory instruction counter are located in the retirement unit.

Example AA1 is an electronic device including means for receiving an instruction, means for incrementing a value in a total instruction counter, means for incrementing a value in a branch instruction counter when the instruction is a branch instruction, means for incrementing a value in a memory instruction counter when the instruction is a memory instruction, means for creating a ratio based on the value in the total instruction counter and the value in the branch instruction counter or the value in the memory instruction counter, and means for triggering an alert when the ratio satisfies a threshold.

In Example AA2, the subject matter of Example AA1 can optionally include where the alert is an interrupt.

In Example AA3, the subject matter of any one of Examples AA1-AA2 can optionally include where the alert is a performance monitor interrupt.

In Example AA4, the subject matter of any one of Examples AA1-AA3 can optionally include means for incrementing a value in a single byte instruction counter when the instruction is a single byte instruction, create a single byte ratio based on the value in the total instruction counter and the single byte instruction counter, and trigger the alert when the single byte ratio satisfies a single byte instruction threshold.

In Example AA5, the subject matter of any one of Examples AA1-AA4 can optionally include means for creating a branch/memory to total instruction ratio based on the value in the total instruction counter, the value in the branch instruction counter, and the value in the memory instruction counter.

In Example AA6, the subject matter of any one of Examples AA1-AA5 can optionally include where the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

In Example AA7, the subject matter of any one of Example AA1-AA6 can optionally include where the ratio indicates a presence of a NOP sled attack.

Example X1 is a machine-readable storage medium including machine-readable instructions to implement a method or realize an apparatus as in any one of the Examples A1-A7, AA1-AA7 or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor, cause the at least one processor to:
    receive an instruction;
    increment a value in a total instruction counter;
    increment a value in a branch instruction counter when the instruction is a branch instruction;
    increment a value in a memory instruction counter when the instruction is a memory instruction;
    create a ratio based on the value in the total instruction counter and the value in the branch instruction counter or the value in the memory instruction counter; and
    trigger an alert when the ratio satisfies a threshold.

2. The at least one non-transitory computer-readable medium of claim 1, wherein the alert is an interrupt.

3. The at least one non-transitory computer-readable medium of claim 1, wherein the alert is a performance monitor interrupt.

4. The at least one non-transitory computer-readable medium of claim 1, further comprising one or more instructions that when executed by the at least one processor, further cause the processor to:
    increment a value in a single byte instruction counter when the instruction is a single byte instruction;
    create a single byte ratio based on the value in the total instruction counter and the single byte instruction counter; and
    trigger the alert when the single byte ratio satisfies a single byte instruction threshold.

5. The at least one non-transitory computer-readable medium of claim 1, further comprising one or more instructions that when executed by the at least one processor, further cause the processor to:
    create a branch/memory to total instruction ratio based on the value in the total instruction counter, the value in the branch instruction counter, and the value in the memory instruction counter.

6. The at least one non-transitory computer-readable medium of claim 5, wherein the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

7. The at least one non-transitory computer-readable medium of claim 1, wherein the ratio indicates a presence of a NOP sled attack.

8. An apparatus comprising:
    memory;
    at least one processor; and
    circuitry and logic configured to:
      receive an instruction;
      increment a value in a total instruction counter;
      increment a value in a branch instruction counter when the instruction is a branch instruction;
      increment a value in a memory instruction counter when the instruction is a memory instruction;
      create a ratio based on the value in the total instruction counter and the value in the branch instruction counter or the value in the memory instruction counter; and
      trigger an alert when the ratio satisfies a threshold.

9. The apparatus of claim 8, wherein the alert is an interrupt.

10. The apparatus of claim 8, wherein the circuitry and logic are further configured to:
    increment a value in a single byte instruction counter when the instruction is a single byte instruction;
    create a single byte ratio based on the value in the total instruction counter and the single byte instruction counter; and trigger the alert when the single byte ratio satisfies a single byte instruction threshold.

11. The apparatus of claim 8, wherein the circuitry and logic are further configured to:
increment a value in a memory instruction counter when the instruction is a memory instruction; and
create a branch/memory to total instruction ratio based on the value in the total instruction counter, the value in the branch instruction counter, and the value in the memory instruction counter.

12. The apparatus of claim 11, wherein the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

13. The apparatus of claim 8, wherein the ratio indicates a presence of a NOP sled attack.

14. The apparatus of claim 8, wherein the circuitry and logic are located in a retirement unit of a computer processing unit.

15. A method comprising:
receiving an instruction, at a retirement unit of a computer processing unit;
incrementing a value in a total instruction counter;
incrementing a value in a branch instruction counter when the instruction is a branch instruction;
creating a ratio based on the value in the total instruction counter and the value in the branch instruction counter; and
triggering an alert at the computer processing unit when the ratio satisfies a threshold.

16. The method of claim 15, wherein the alert is an interrupt.

17. The method of claim 15, wherein the alert is a performance monitor interrupt.

18. The method of claim 15, further comprising:
incrementing a value in a memory instruction counter when the instruction is a memory instruction; and
creating a branch/memory to total instruction ratio based on the value in the total instruction counter, the value in the branch instruction counter, and the value in the memory instruction counter.

19. The method of claim 18, wherein the branch/memory to total instruction ratio includes the value in branch instruction counter multiplied by the value in total instruction counter and added to the value in memory instruction counter multiplied by the value in total instruction counter to create a result and the result is subtracted from the value in total instruction counter.

20. The method of claim 15, further comprising:
incrementing a value in a single byte instruction counter when the instruction is a single byte instruction;
creating a single byte ratio based on the value in the total instruction counter and the single byte instruction counter; and
triggering the alert when the single byte ratio satisfies a single byte instruction threshold.

21. The method of claim 15, wherein the ratio indicates a presence of a NOP sled attack.

22. A system for an identification of a no-operation (NOP) sled attack, the system comprising:
a computer processing unit, wherein the computer processing unit includes a retirement unit; and
circuitry and logic at least partially located in the retirement unit, wherein the circuitry and logic are configured to:
receive an instruction;
increment a value in a total instruction counter;
increment a value in a branch instruction counter when the instruction is a branch instruction;
increment a value in a memory instruction counter when the instruction is a memory instruction;
create a ratio based on the value in the total instruction counter and the value in the branch instruction counter and the value in the memory instruction counter; and
trigger an alert when the ratio satisfies a threshold, wherein the alert provides the identification of a NOP sled attack.

23. The system of claim 22, wherein the alert is an interrupt.

24. The system of claim 22, wherein the circuitry and logic are configured to:
increment a value in a single byte instruction counter when the instruction is a single byte instruction;
create a single byte ratio based on the value in the total instruction counter and the single byte instruction counter; and
trigger the alert when the single byte ratio satisfies a single byte instruction threshold.

25. The system of claim 22, wherein the total instruction counter, the branch instruction counter, and the memory instruction counter are located in the retirement unit.

* * * * *

UNITED STATES PATENT AND TRADEMARK OFFICE
CERTIFICATE OF CORRECTION

PATENT NO. : 10,963,561 B2  
APPLICATION NO. : 16/121590  
DATED : March 30, 2021  
INVENTOR(S) : Brent Sherman et al.

Page 1 of 1

It is certified that error appears in the above-identified patent and that said Letters Patent is hereby corrected as shown below:

In the Drawings

On Sheet 3 of 10 (Reference Numeral 320) FIGURE 3, delete "SECONDTHRESHOLD" and insert -- SECOND THRESHOLD --, therefor.

On Sheet 6 of 10 (Reference Numeral 514) FIGURE 5A, delete "SINGE" and insert -- SINGLE --, therefor.

On Sheet 9 of 10 (Reference Numeral 742) FIGURE 7, Delete "Wifl" and insert -- Wifi --, therefor.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*